May 31, 1960 H. L. JOHNSON 2,938,543
VALVE
Filed Sept. 28, 1955 3 Sheets-Sheet 1

Inventor
Harold L. Johnson
By his attorneys
Howson and Howson

May 31, 1960

H. L. JOHNSON 2,938,543

VALVE

Filed Sept. 28, 1955

Inventor
Harold L. Johnson
By his attorneys
Howson and Howson

May 31, 1960 H. L. JOHNSON 2,938,543
VALVE
Filed Sept. 28, 1955 3 Sheets-Sheet 3

Inventor
Harold L. Johnson
By his attorneys
Howson and Howson

United States Patent Office 2,938,543
Patented May 31, 1960

2,938,543

VALVE

Harold L. Johnson, Dallas Township, Luzerne County, Pa., assignor to W. H. Nicholson & Company, Wilkes-Barre, Pa., a corporation of Pennsylvania Filed Sept. 28, 1955, Ser. No. 537,182

10 Claims. (Cl. 137—624)

This invention relates to a valve, and more particularly to a valve of the flat disc type. The invention is primarily useful in its application to valves for operating cylinders, i.e. instigating and controlling the movement of a piston in a single- or a double-acting cylinder, to which use, however, it is not restricted.

The advantages of the flat disc type valve are well known. However, present methods of accurately centering the component parts of the valve housing, the movable disc and the valve-turning stem within the housing have not proved to be wholly satisfactory, and the production of such parts has required expensive operations. Furthermore, present arrangements for lubricating the moving contacting surfaces of flat disc type valves are unduly complicated. Finally, known methods of throttling the valve ports to control the rate at which fluid passes through the valve are susceptible of improvement.

The present invention provides a valve of the flat disc type which possesses the present advantages of such valves while embodying improved functioning, simpler servicing requirements and greater economy of manufacture. The new housing parts and the valve-turning stem afford more accurate alignment and better valve operation than heretofore. At the same time, pressure lubrication has been simplified and bettered. Moreover, an improved combination and arrangement of elements is provided for adjustably throttling the ports of the valve.

It is characteristic of a valve made in accordance with my invention that the body and base are held together and in rough alignment by an encircling clamp and in exact alignment by a valve stem fitted to bearings in the body and base so that the stem determines the exact alignment and the clamp holds the two parts together. In a flat disc valve according to my invention when used as a directional control valve for single- or double-acting cylinders, the operating handle on the valve stem can control the piston speed in one or both direction independently.

One form of the invention is shown by way of illustration in the accompanying drawings, in which.

Figure 3:
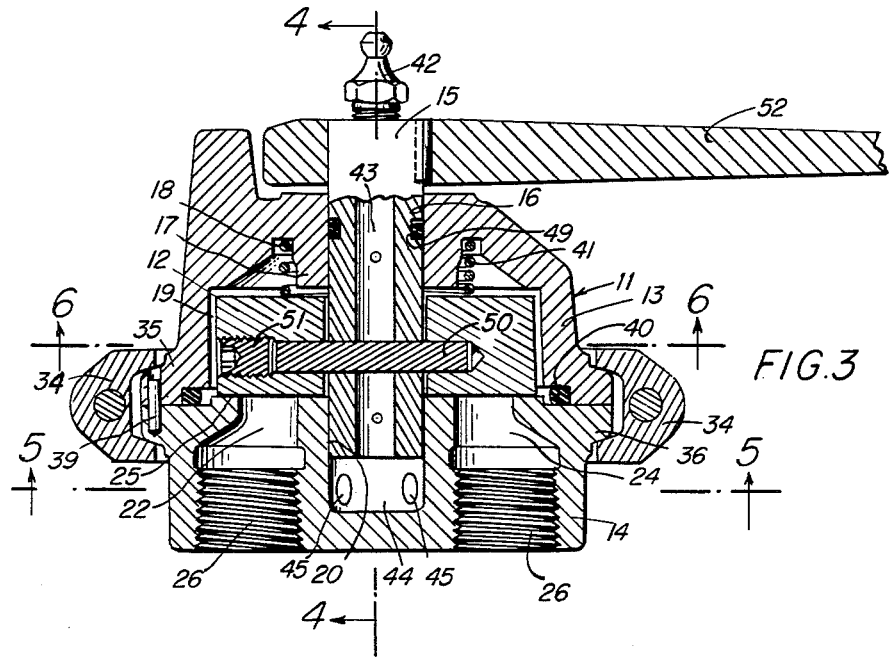
Fig. 3 is a view in vertical section of the valve taken on the median line 3—3 of Fig. 2 in the direction of the operating lever.
Figure 4:
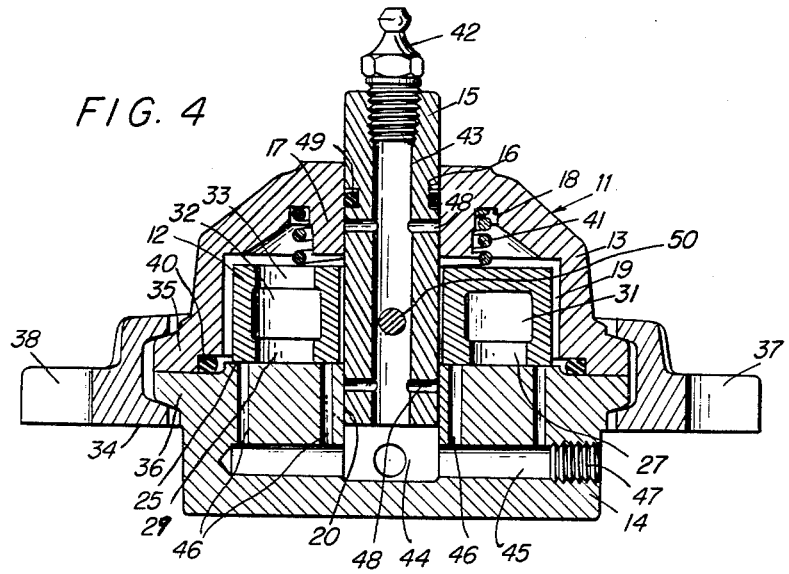

Fig. 4 is a similar view of the valve in vertical section, taken in a plane 90° removed from that of Fig. 3 and on the line 4—4 of Fig. 3, the base being shown 45° out of neutral position.

Figure 5:
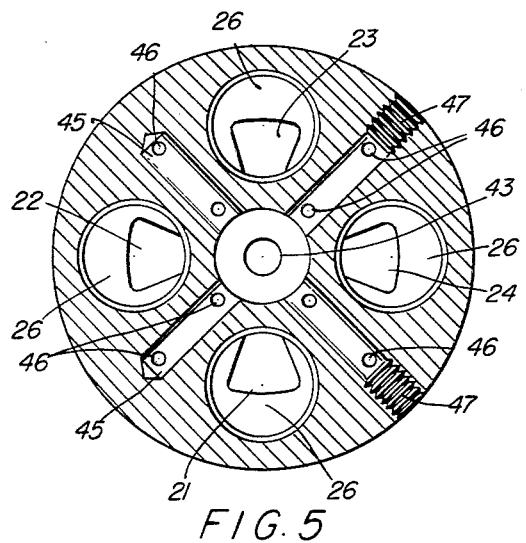

Fig. 5 is a view in horizontal cross section of the valve taken through the base on the line 5—5 of Fig. 3.

Figure 6:
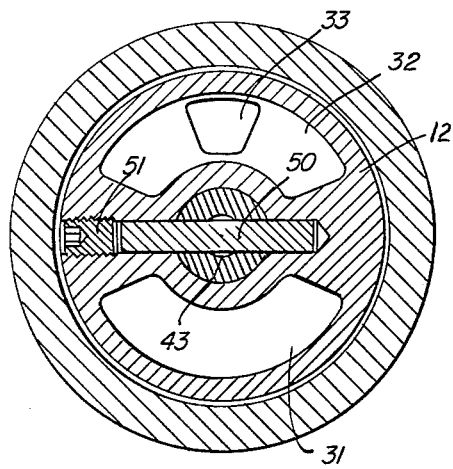

Fig. 6 is a horizontal cross section of the valve taken through the body on the line 6—6 of Fig. 3.

Figure 7:
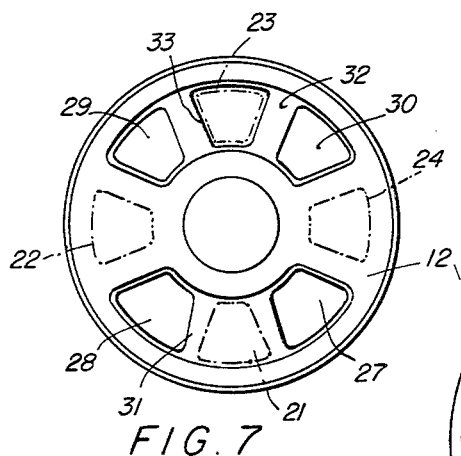

Fig. 7 is a plan view of the disc and the ports under it, as seen in Fig. 3, the ports in the base being shown in dot-and-dash lines.

Figure 8:
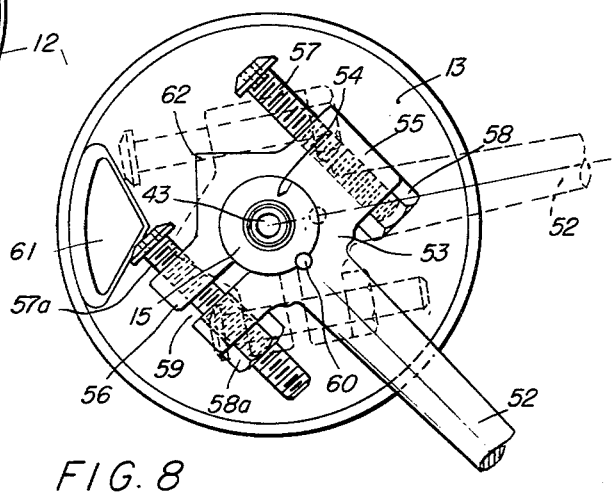

Fig. 8 is a plan view of the housing of the valve of Figs. 1-7, illustrating the adjustable means for throttling the opening of the valve ports; the lever being shown in solid lines in one extreme position and in dotted lines for the modulated throttling in the other extreme position.

The embodiment of the invention which is illustrated in the drawings is a valve in which there is a housing 11 composed of a body 13 and a base 14. Within the housing is a disc 12 which is turned to open and close the ports of the valve. The disc 12 is positioned within the body 13 and turns on and in contact with the base 14 in which valve ports are formed. A valve-turning stem 15 extends centrally through the body 13, through the disc 12 which is fixed to it, and into the base 14 (see Figs. 3 and 4).

The body 13 of the valve housing 11 is a generally shell-like member and has a central opening 16 therein through which the stem 15 projects for connection to and operation of the disc. There is a central integral annular boss 17 on the body 13 prolonging the central opening 16, thus forming an extended cylindrical bearing through which the stem 15 extends into the body 13. Surrounding the annular boss is an annular channel 18 formed within the body for a purpose which will later appear.

Within the body 13 there is a cylindrical bore or cavity 19 coaxial with the central opening 16, of a size to accommodate the disc 12 with ample clearances. The turning stem 15, extending through the cylindrical bearing formed by the boss 17, turns the disc within the cavity 19 when the stem itself is turned.

The base 14 of the valve housing 11 is coaxially held against the body 13, in a manner later to be described, to close the cavity 19 therein and to coact with the disc 12. The base has an extended cylindrical central bearing 20 into which the inner end of the turning stem 15 projects when the body, the base and the stem are aligned exactly.

It will be seen that the central bearing 20 in the base 14 acts as an inboard bearing, which, in conjunction with the central opening 16 of the body 13 acting as an outboard bearing, provides stem rigidity and maintains the exact alignment of the body 13, base 14 and stem 15. The valve stem bearing in the body 13 and the central bearing in the base 14 are here shown as cylindrical in form. The length of the bearing 16 in the body is also shown as greater than half the diameter of the valve stem, and the valve stem is shown as extending into the bearing 20 in the base for a distance greater than half the diameter of the valve stem, thereby assuring alignment of the body and the base by the valve stem.

In the embodiment illustrated, the base 14 has four valve ports 21, 22, 23, 24 formed therein, spaced apart at equi-angular intervals (see Figs. 3, 5 and 7). Those valve ports terminate at the contact or mating surface 25 of the base 14 with the disc 12. In continuation downward of the valve ports, and opening through the lower face of the base, are internally threaded cylindrical passages 26 into which conduits may be screwed to connect with an external unit which the valve controls.

As an example of how the valve may be used, the base port 23 may be connected to a source of fluid under pressure; the base port 22 may be connected to one end of a double-acting cylinder (not shown) in which a piston is to be moved; the base port 21 may be connected to an exhaust; and the base port 24 may be connected to the end of the cylinder opposite to the end to which the port 22 is connected. It is necessary to design the disc 12 to connect the port 21 with the port 22 and the port 24 with the port 23 when the disc is in one position. The port 21 must connect with the port 24 and the port 22 with the port 23 when in the other position. All ports must be closed when the lever is in an intermediate "neutral" or "off" position (see Fig. 2). For controlling the flow to and from a single-acting cylinder, the port 24 may be omitted, or its connecting threaded cylindrical passage may be plugged with a standard pipe plug.

The disc 12 is formed with four ports 27, 28, 29, 30 positioned to register with the respective valve ports of the base 14 in two positions of the disc, and to be moved out of register with all these base ports when the disc is turned into "neutral" or "off" position. The "neutral" or "off" position of the disc and the closing of the valve or base ports are illustrated in Figs. 1, 2, 3, 4 and 7. By referring to Fig. 7, it will be seen that a 45° clockwise movement of the disc 12 from the "neutral" or "off" position will cause the port 27 of the disc to register with the port 21 of the base; the disc port 28 to register with the base port 22; the disc port 29 to register with the base port 23; and the disc port 30 to register with the base port 24. On the other hand, a counterclockwise movement of the disc from the "neutral" or "off" position will bring the port 27 into register with the port 24; the port 28 into register with the port 21; the port 29 into register with the port 22; and the port 30 into register with the port 23. The ports in the base and in the disc are preferably trapezoidal-shaped, for a purpose which will appear later. Disc ports 27 and 28 are made slightly wider than disc ports 29 and 30 and base ports 21, 22, 23, 24 (see Fig. 7). The purpose of this is to make certain pressure starts to exhaust from one end of a double-acting cylinder before the other end of the cylinder starts to receive pressure.

In order that the disc 12 may connect the ports as described above, a channel 31 is formed in the disc connecting ports 27 and 28, and another channel 32 is formed in the disc to connect its ports 29 and 30. Fig. 7 clearly shows the channel and port arrangements in the disc, and also the relationship between the ports and the channels in the disc and the ports in the base. By turning the disc through 45° in the clockwise direction from the position shown in Figs. 2 and 7, the ports 21 and 22 in the base will be connected by the disc through channel 31, while at the same time the disc connects the ports 23 and 24 through channel 32. Conversely, by turning the disc through 45° in counterclockwise direction from "neutral," the ports 21 and 24, and the ports 23 and 22, will be connected.

Figure 1:
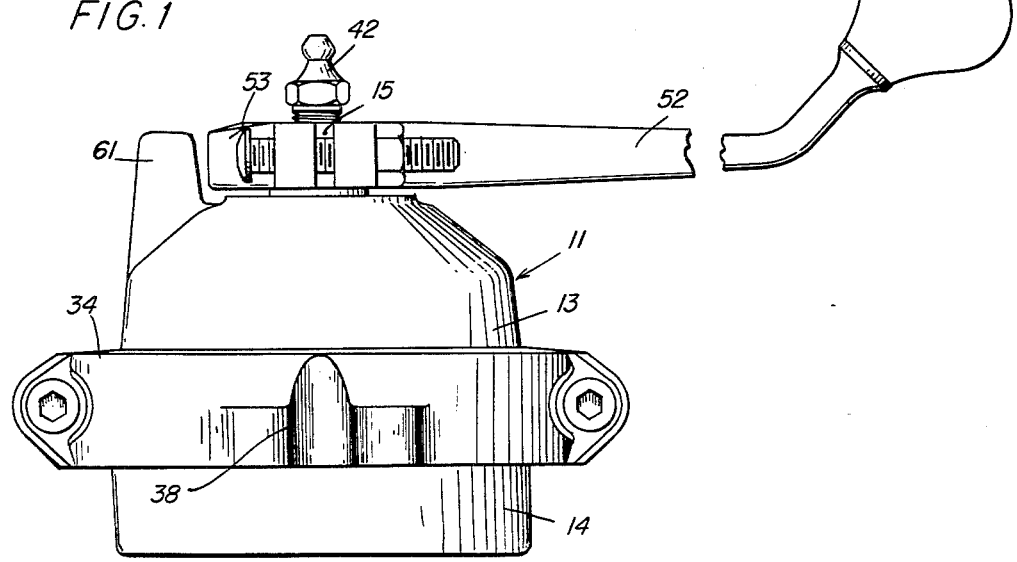
Fig. 1 is a view in elevation of a flat disc valve constructed according to the invention.
Figure 2:
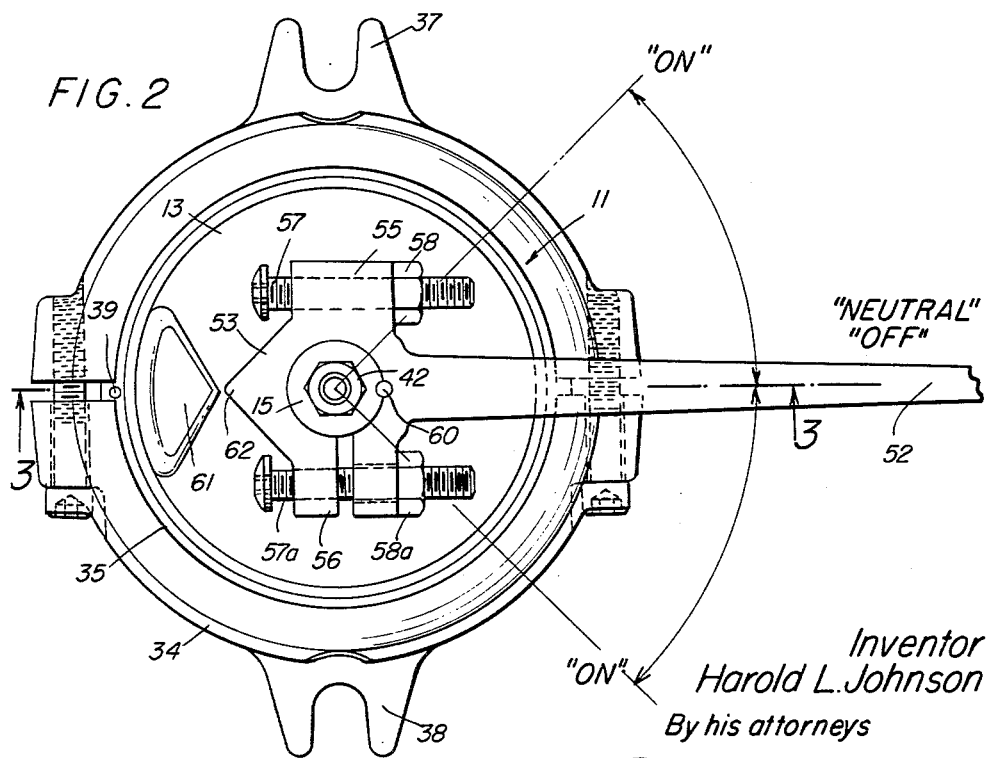
Fig. 2 is a plan view of the valve illustrated in Fig. 1.

When the operating lever 52 is moved to the position marked "neutral" or "off" in Fig. 2, the indicator 62 points to the apex of the triangular abutment 61 on the body 13. The ports 21, 22, 23, 24 of the base and ports 27, 28, 29, 30 of the disc will be in the position of Fig. 7 and all flow of the pressure medium through the valve and to and from the cylinder ceases.

An opening 33 extends upward out of the disc 12 from the channel 32 (see Fig. 4), in the opposite direction to that of the disc ports 27, 28, 29, 30, thus permitting the pressure fluid to enter the cylindrical cavity 19 where it exerts an unbalanced pressure or force on the disc 12, for maintaining disc 12 on base 14 and assuring a leak-proof abutment of the mating surfaces 25 of disc 12 and base 14.

Means is provided for clamping the body 13 of the valve to the base 14 when aligned by the valve stem 13. It is preferred to employ for this purpose a two-part clamp ring 34 which is tightened about a beveled annular flange 35 on the body and a matching beveled annular flange 36 on the base. Lugs 37 and 38 are preferably formed on the respective parts of the clamping ring whereby the valve may be fixed in position on a bracket, column or panel (not shown). The clamp ring can be reversed so the valve can be installed on either the front or the back of the panel. A locating pin 39 projects into holes in the flanges 35 and 36 in order to position the base and its ports suitably with respect to the axis of the body. An O-ring 40 is compressed in well-known manner between the body and the base to seal the junction between them when the clamp ring 34 is tightened.

To avoid the time and expense of exactly machining the beveled surfaces of the annular flanges 35 and 36 and the contacting surfaces of the two-part clamp ring, the parts are designed so that the clamp ring gives the body and the base only rough alignment. The turning stem 15 positioned in the extended central bearings 16 and 20 serves to align the body and the base exactly.

The mating surfaces 25 of the disc 12 and the base 14 are lapped in well-known manner to give a common contact which is substantially leak-proof. A helical spring 41 has one end seated in the annular channel 18 within the body 13 and bears at its other end upon the top of the disc 12 to hold it resiliently against the base 14.

For lubricating the various bearing surfaces of the valve, a high-pressure fitting 42 of standard construction is screwed into the outer or upper end of the turning stem 15, and a passage 43 extends straight through the center of the stem in an axial direction from the fitting 42 to the bottom end of the stem. The central bearing 20 in the base 14 is prolonged to provide a pressure reservoir 44 below the stem, into which lubricant under pressure passes from the fitting 42 through the passage 43. There are further formed in the base 14, passages connecting the pressure reservoir 44 with the mating surfaces 25. These are passages or bores 45 projecting radially from the reservoir, and bores 46 extending upward therefrom to the surfaces of contact 25. The radially-extending bores 45 are closed at their outer ends by screw plugs 47 threaded therein.

From the foregoing it will be evident that lubricant under pressure exerted through the fitting 42, the passage 43 through the turning stem, the pressure reservoir, the radial passages 45 and the bores 46, lubricates the mating surfaces 25 between the disc and the base. It will also be observed that, because the pressure reservoir is positioned immediately under and in contact with the lower end of the turning stem, pressure of the fluid entering body cavity 19 through opening 33 in top of disc 12 is exerted through the slight clearance between stem 15 and cylindrical bearing 16 of the body 13, and between stem 15 and cylindrical bearing 20 of base 14, thence through transverse bores 48 and passage 43 in stem 15 to the lubricant in reservoir 44. This pressure then acts on the lower end of stem 15 to exert an upward force to the connected disc, partially balancing the pressure on top of the disc, thereby reducing the operating effort necessary to operate the valve. This pressure also acts on the surplus lubricant in reservoir 44, radial passages 45 and bores 46, to keep the lubricant in contact with the mating surfaces 25 of disc 12 and base 14.

It is here noted that transverse bores 48 through the passage 43 terminating at the circumferential surface of the stem serve to lubricate the central bearings in the body and base. The O-ring 49 in an annular groove in the stem seals the central bearing on the body 13 against loss of lubricant, and against leakage of pressure fluid from body cavity 19 to the exterior of the valve.

There is a disc drive pin 50 passing through the turning stem and into the disc on opposite sides thereof. The disc 12 is thus connected to the turning stem 15 by which it is operated. The central hole in the disc 12 through which the stem 15 passes, and the bores in the disc and the stem through which the drive pin 50 extends, can have diameters sufficiently larger than the stem and the pin, respectively, to provide an effective universal joint between the disc and the stem. The disc may accordingly accommodate itself to the base without binding, as it is rotated with respect thereto. Because of the loose fit of the drive pin in the stem and the disc, a standard set screw 51 is threaded into the open end of the hole in the disc in which the pin is positioned to keep the pin in place. The axial passage 43 in the turning stem which carries the lubricant to the reservoir 44 is larger in diameter than the disc drive pin 50 which permits the lubricant to pass by the drive pin (see Fig. 6).

The combination and arrangement of elements for adjustably throttling the valve ports will now be described. The turning stem 15 is here shown as operated by a lever 52 having a split yoke end 53 with a central opening 54 therein. The opening 54 is of a size to fit closely over the outer end of the stem, to which the split yoke may be fixed by tightening (see Fig. 8). The split yoke end 53 is provided with lugs 55 and 56 on opposite sides of the center line of the lever 52, parallel to which a bore is formed in each lug (see Figs. 2 and 8).

The bore in the lug 55 is threaded from end to end. A standard screw 57 is threaded into this bore with its head away from the lever 52. A nut 58 engages the end of the screw which extends out of the lug 55 toward the lever, bearing against the lug to fix it in adjusted position with its head at the desired distance beyond the lug 55.

The lug 56 on the opposite side of the stem is split, having a transverse slot 59 therein extending from its outer surface to the central opening 54 at right angles to the center line of the lever 52. The bore through that part of the split lug 56 which is furthest from the lever 52 is threaded. The bore through the nearer part is unthreaded and slightly enlarged. A standard screw 57a, like the screw 57, is threaded into the further part of the split lug and projects through the bore in the nearer part, beyond which a nut 58a is threaded upon the end of the screw to bear against the lug. When the nut 58a is not tightened, the split yoke end 53 may be passed over the outer end of the stem 15 to surround it. Tightening the nut 58a upon the screw 57a clamps the yoke tightly about the stem, which may then be turned by the lever 52. A function of the screw 57a is therefore to clamp the yoke about the stem. The screw 57a may also be adjusted in its projection ahead of the yoke exactly as is the screw 57.

In order to fix the relative positions of the lever 52 and the stem 15 and to transmit movement to the stem more positively, a small hole is drilled with substantially half of its circumference in the stem and half in the yoke, parallel to the axis of the stem and in the center line of the lever. A pin 60 is then snugly fitted in this hole (see Figs. 2 and 8).

The adjusted projection of the screw 57 and the screw 57a ahead of the split yoke 53 may be employed to limit the turning of the lever 52 in both directions from its "neutral" or "off" position, and accordingly to limit the turning of the stem 15 and the disc 12. To this end, an abutment 61 of generally triangular shape is formed on the outside of the body 13 to project into the path of travel of both screw heads. The abutment is centered with respect to the center line of the lever 52 when in "neutral" or "off" position, and a pointer 62 is formed on the split yoke 53 in the center line of the lever to indicate this position.

Since the angle through which the stem is turned determines the degree to which the ports of the disc 12 coincide with those of the base 14, the screws 57 and 57a may be used to throttle the ports of the valve according to their setting. This may be done independently in each of the two directions in which the lever 52 may be turned from the "neutral" or "off" position. No necessity exists, therefore, for separate speed control devices in the connecting piping.

By employing trapezoidal-shaped ports in base and disc, modulated throttling of the valve ports is made possible. Thus the screws 57 and 57a not only act as limit stops for wide-open ports or provide speed control of a piston by limiting the opening of the flat disc ports whether round or trapezoidal, but screw 57a clamps the operating lever 52 on the stem 15.

It will be seen that the clamp holds the parts together and determines only the rough alignment. The stem and inboard and outboard bearings give a smooth, accurate alignment, especially in connection with the flat disc partially-balanced pressure and lubrication. This central turning stem relation to the disc and bearings is important in connection with the associated speed-control means on the control lever.

What is claimed is:

1. A valve having a base with a central bearing therein for a valve stem, and a body registerable with said base having a similar bearing therein and a valve stem in the two bearings adapted to align the base and body exactly, in combination with means encircling the base and body clamping them together but leaving them free to move to exact alignment; whereby the valve stem aligns the parts while the encircling means merely clamps the parts together in said exact alignment.

2. A valve comprising a valve stem, a body having therein a central bearing for said valve stem, and a base registrable with said body having therein a similar bearing for said valve stem, said valve stem extending through the bearing in said body and into the bearing in said base thereby exactly aligning said body and said base; in combination with means encircling said body and said base to clamp them together but leaving them free to move into axial alignment when being aligned by said valve stem, said clamping means retaining said body and base in said exact alignment.

3. A valve comprising a valve stem, a body having therein a central bearing for said valve stem of a length greater than half the diameter of said valve stem; and a base registrable with said body having therein a similar bearing for said valve stem, said valve stem extending through the bearing in said body and into the bearing in said base for a distance greater than half the diameter of said valve stem thereby exactly aligning said body and said base; in combination with means encircling said body and said base to clamp them together but permitting them to move into said exact alignment when aligned by said valve stem and to retain them in said exact alignment.

4. A valve comprising a base having a valve stem bearing positioned centrally therein, a body registerable with said base having a valve stem bearing positioned centrally therein, and means for clamping said base to said body in rough alignment therewith but leaving said base and said body free to move into exact alignment, in combination with a valve stem adapted to fit without play in the two bearings; whereby positioning the valve stem in both bearings aligns the base and the body exactly and also aligns the stem for operation within the base and body, said clamping means retaining said base and said body in said exact alignment.

5. A valve according to claim 1 in which the encircling means is a clamping ring, there being external bevelled flanges on the body and base to be gripped by the ring, and lugs projecting outwardly from the ring for attaching the valve to a supporting structure 6. A flat disc valve comprising a body having a cylindrical bearing extending centrally therethrough, a disc positioned in said body having ports and channels connecting the ports, a valve base having ports therein for registry with the ports in the disc at contact surfaces of the base and disc, there being a cylindrical bearing therein for registry with the bearing in the body and means for clamping the body and base together in rough alignment but leaving them free to move into exact alignment; in combination with a turning stem fitting closely in the body and base bearings, and a pin carried by the stem extending into the disc, the fit of the disc on the stem being loose to accommodate the disc to the base without binding, whereby the stem determines the exact alignment of the base and body and drives the disc, said clamping means retaining said base and body in said exact alignment.

7. A flat disc valve according to claim 6 in which there is a passage extending axially through the stem to carry lubricant to the valve, the central bearing in said base being prolonged to provide a pressure reservoir for lubricant below the end of said stem, said disc, base and body providing a connecting passage between the pressure medium being controlled by the valve and the reservoir, and said medium establishing a pressure on the lubricant in the pressure reservoir under the stem, said base also having passages therein connecting the pressure reservoir with the contact surfaces of said base and said disc to lubricate the surfaces.

8. A flat disc valve according to claim 6 in which there is a passage extending axially through the stem to carry lubricant to the valve, the central bearing in said base being prolonged to provide a pressure reservoir underneath the end of said stem, said disc, base, and body providing a connecting passage between the pressure medium being controlled by the valve and the reservoir, and said medium establishing a pressure on the lubricant in the pressure reservoir under the stem, there being spring means between the body and the top of the disc, whereby a partial balance of the disc is obtained through the pin.

9. A flat disc valve comprising a body having a cylindrical bearing extending centrally therethrough, a disc fitting loosely in the body having ports and channels connecting the ports, a valve base having ports therein for registry with the ports in the disc, there being a cylindrical bearing in the base, means for clamping the body and the base together in rough alignment, a turning stem fitting closely in the body and base bearings and a pin carried by the stem extending into the disc, there being a passage extending axially through the stem and prolonged below the stem to provide a pressure reservoir for lubricant, and passages connecting the pressure reservoir with the contact surfaces and with the medium being controlled by the valve whereby pressure upwards is established under the disc, in combination with spring means between the body and the top of the disc, a lever fixed to the outer end of the stem for turning it, an abutment on the body positioned adjacent the lever, and adjustable elements carried by the lever for contact with the abutment as the lever turns the stem to limit turning of the lever and to throttle the opening of the valve ports.

10. A flat disc valve according to claim 9 in which certain disc ports are wider than others whereby upon turning of the lever pressure can exhaust through one set of connections before pressure is transmitted by another set of connections.

References Cited in the file of this patent

UNITED STATES PATENTS

| | | |
|---|---|---|
| 881,228 | Dyblie | Mar. 10, 1908 |
| 1,118,297 | McElroy | Nov. 24, 1914 |
| 2,097,409 | Wertz | Oct. 26, 1937 |
| 2,209,136 | Parker | July 23, 1940 |
| 2,238,101 | Clifford | May 2, 1940 |
| 2,665,875 | MacGregor | Jan. 12, 1954 |

FOREIGN PATENTS

| | | |
|---|---|---|
| 463,167 | Germany | July 23, 1928 |
| 834,448 | France | 1938 |
| 727,804 | Great Britain | Aug. 6, 1955 |